(12) United States Patent
Liu et al.

(10) Patent No.: US 9,365,669 B2
(45) Date of Patent: Jun. 14, 2016

(54) SLUMP RETAINING POLYCARBOXYLIC ACID SUPERPLASTICIZER

(71) Applicants: SOBUTE NEW MATERIALS CO., LTD., Nanjing (CN); BOTE BUILDING MATERIALS (TIANJIN) CO., LTD, Tianjing (CN)

(72) Inventors: Jiaping Liu, Nanjing (CN); Dongliang Zhou, Nanjing (CN); Qianping Ran, Nanjing (CN); Yong Yang, Nanjing (CN); Jinzhi Liu, Nanjing (CN)

(73) Assignees: SOBUTE NEW MATERIALS CO., LTD., Nanjing (CN); BOTE BUILDING MATERIALS (TIANJIN) CO., LTD, Tianjin (CN)

( * ) Notice: Subject to any disclaimer, the term of this patent is extended or adjusted under 35 U.S.C. 154(b) by 0 days.

(21) Appl. No.: 14/649,977

(22) PCT Filed: Dec. 5, 2012

(86) PCT No.: PCT/CN2012/085909
§ 371 (c)(1),
(2) Date: Jun. 5, 2015

(87) PCT Pub. No.: WO2014/085996
PCT Pub. Date: Jun. 12, 2014

(65) Prior Publication Data
US 2015/0291716 A1 Oct. 15, 2015

(51) Int. Cl.
*C08F 220/06* (2006.01)
*C08F 220/28* (2006.01)
*C04B 24/26* (2006.01)
*C08F 220/20* (2006.01)
*C09D 133/08* (2006.01)
*C08F 216/14* (2006.01)
*C04B 103/30* (2006.01)

(52) U.S. Cl.
CPC ........... *C08F 220/28* (2013.01); *C04B 24/2647* (2013.01); *C08F 216/1416* (2013.01); *C08F 220/06* (2013.01); *C08F 220/20* (2013.01); *C09D 133/08* (2013.01); *C04B 2103/308* (2013.01); *C08F 2216/1433* (2013.01); *C08F 2220/286* (2013.01)

(58) Field of Classification Search
CPC ................ C08F 2216/1333; C08F 2216/1433; C08F 2220/286; C08F 2220/281; C08F 220/06; C04B 24/2694
See application file for complete search history.

(56) References Cited

FOREIGN PATENT DOCUMENTS

| | | |
|---|---|---|
| CN | 1673162 | 9/2005 |
| CN | 101786824 | 2/2010 |
| CN | 101708973 | 5/2010 |
| CN | 102093521 | 12/2010 |
| CN | 101357833 | 2/2011 |
| CN | 102557513 | 7/2012 |
| EP | 2463314 | 6/2012 |

*Primary Examiner* — Vu A Nguyen
(74) *Attorney, Agent, or Firm* — Treasure IP Group, LLC

(57) ABSTRACT

A slump retaining polycarboxylic acid superplasticizer. A weight average molecular weight of the superplasticizer is 20,000-80,000. The slump retaining polycarboxylic acid superplasticizer is prepared by performing polymerization reaction on a monomer A, a monomer B, a monomer C and a monomer D in an aqueous solution in the presence of a redox initiator, wherein a molar ratio of (the monomer A+the monomer B):the monomer C:the monomer D is 1:(3-8):(4-12), and a molar ratio of the monomer A to the monomer B is 1:(1-4).

10 Claims, No Drawings

SLUMP RETAINING POLYCARBOXYLIC ACID SUPERPLASTICIZER

TECHNICAL FIELD

The present invention relates to a polycarboxylate cement dispersant having a triple-control capacity of cement concrete fluidity change with time, thus, belongs to the technical field of concrete admixtures.

BACKGROUND ART

The unprecedented scale of national infrastructure development has brought forward higher requirements for high performance concrete, and also posed a great challenge. The complex for structure of constructions and automation of construction methods require that the fluidity of high performance concrete to hold longer, and the high performance concrete itself, using a lot of mineral admixtures and additives with a variety of functions also makes it harder to maintain the fluidity. Moreover, due to the vast territory and significant seasonal variation of China, the quality and properties of concrete raw materials vary greatly, the quick loss of fluidity for fresh concrete during mixing and transporting often encounters. The insufficient capability for slump retention of concrete has brought a lot of problems for project construction and quality of concrete, especially in the summer, under high temperature, when the slump of concrete is relatively low or there is the demand for super long time slump, this phenomenon becomes even more pronounced. The reasons are as follows: the quick loss of slump was caused by the acceleration of cement hydration and water evaporation due to high temperature in summer; concrete with relatively low slump may encounter fluidity loss in short time due to its low content of free water in the system; the prolonged time for concrete construction has led to the increase of cement hydration products, and the fluidity loss may gradually occur if the generated hydration products are not going to be dispersed with extra dispersant in the concrete system. Therefore, the natures of fluidity loss caused by a variety of factors are not the same, and the time requirements for supplement of dispersant are not the same either.

With the advantages of low dosage, high water reduction, better slump retention than naphthalene superplasticizer, reducing concrete shrinkage, no pollution during preparation and so on, the polycarboxylate superplasticizer has become an indispensable key ingredient in preparing high performance concrete and also become a hot research topic. After the rapid development in recent years, the polycarboxylate superplasticizer has been greatly improved in water reducing capability, which indirectly led to the gradual decrease of the dosage for polycarboxylate superplasticizer in concrete system, and also gradually exposed the insufficient slump retention capability of the concrete mixed with polycarboxylate superplasticizer.

In order to solve the issues quick fluidity loss of concrete mixed with polycarboxylate superplasticizer, researchers in related fields at home and abroad have done a lot of research. In addition to traditional methods of retarding, currently the most effective method to ease the concrete fluidity loss is to add slump-retaining component, and many patents have published the preparation methods of the associated polycarboxylate polymers with the function of slump retention.

Patent CN101786824A discloses the preparation method of a sustained-release polycarboxylate water-reducing agent, this method is made through the radical aqueous copolymerization of polyoxyethylene ether macromonomer containing unsaturated double bond, (methyl) acrylic acid, unsaturated sulfonic acid or its monomer, monoolefins acid derivatives and diene carboxylic acid derivatives, and then neutralized with alkaline solution. The polycarboxylate water-reducing agent prepared through this method has the effect of preventing the fluidity loss due to long time transportation, however, the no dispersed effect at initial stage may cause the issue of high dosage when using as complex together with general polycarboxylate water-reducing agent, and the polymer in this structure needs longer time before it can have the effect of slump retention, therefore, it cannot solve the problem of quick fluidity loss due to the acceleration of cement hydration under high temperature in summer, which has significant limitation.

Patent CN101357833A discloses a slump-retaining type polycarboxylate superplasticizer; this method adopts part of the unsaturated polyether macromonomer to replace the unsaturated macromonomer to improve the stability of the molecular structure of polymer under the strong alkaline environment of cement, so as to improve the capability of slump retention. Meanwhile, itaconic acid was introduced into polymer molecular as adsorption group to improve its capability of slump retention. The polycarboxylate superplasticizer prepared through this method has stronger dispersion capacity, but due to no sustained-release groups in the molecule, it is unable to meet the needs of later age dispersion of concrete system, thus, there is still great room for improvement.

Patent CN102093521A discloses the preparation method of a polycarboxylate high slump-retaining agent; this method adopts the copolymerization of polyethylene glycol allyl polyether, maleic anhydride, maleic anhydride polyethylene glycol diester and acrylic acid, and then the neutralization by adding alkali. This method took the advantage of not requiring water carrier during the esterification of anhydride and reduced pollution; however, due to the low activity of polymerization of allyl polyether, maleic anhydride and its derivatives, there is a certain degree of difficulty for the polymerization, so that there is still great room for improvement.

In summary, we can see that, due to the limit of molecular structure of the existing technology, only certain aspect of the integrated problem that has been encountered during the use of concrete can be met, such as, most polymers with long slump-retaining time have relatively low water reduction, and cannot present the effect of slump-retaining in short time, thus cannot meet the requirement of some concretes for slump-retaining in short time, while the slump-retaining agent which can meet the short-term needs cannot last long enough. Therefore, it is very necessary to develop a fully functional slump-retaining type polycarboxylate superplasticizer of high performance, which can quickly present its effect and can remain functional, to solve the issue of the fluidity loss of modern high performance concrete.

SUMMARY OF INVENTION

The present invention is aiming on providing an efficient slump-retaining type polycarboxylate superplasticizer in respect to the insufficiency of existing technology, this superplasticizer has gone through special molecular design which makes polymer molecular have the capability of multiple regulation to concrete fluidity, having effectively solved the issues of quick fluidity loss of concrete in short time after mixture, and also avoided the defects caused by adding water or extra additives at site due to insufficient fluidity of the concrete, such as, degradation in performance, decrease in economy of concrete and increase in difficulty of construction.

A large number of experiments proved that ester hydrolysis can occur in alkaline environment of cement and gradually generate carboxylic acid group (—COO—); moreover, it was also found that different types of ester have different rates for hydrolysis, which causes the difference of rates in the generating of carboxylic acid groups by molecules. The present invention has presented a slump-retaining type polycarboxylate concrete superplasticizer which has ester groups with two different release rates simultaneously in one molecular, enabling it to have the capability of multiple regulation to concrete fluidity in the concrete system.

The superplasticizer described in the present invention is with weight-average molecular weight of 20,000 to 80,000, which is obtained through polymerization reaction of monomer A, monomer B, monomer C and monomer D in aqueous solution with the existence of redox initiator, the molar ratio, (monomer A+monomer B):monomer C:monomer D, is 1:3~8:4~12, wherein, molar ration of monomer A and monomer B is 1:1~4.

Monomer A is represented by general formula (1):

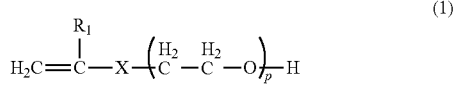
(1)

In general formula (1), $R_1$ represents H or $CH_3$; $X=O$, $CH_2O$, $CH_2CH_2O$; p represents the average addition molar number of ethylene oxide, which is integer between 110 and 350, preferably between 135 and 230.

Monomer B is represented by general formula (2):

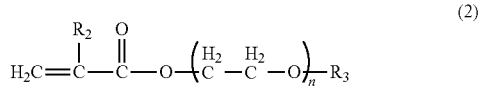
(2)

In general formula (2), $R_2$ represents H or $CH_3$; $R_3$ represents alkyl having carbon number of 1~4; n represents the average addition molar number of ethylene oxide, which is integer between 20 and 90.

Monomer C is represented by general formula (3):

(3)

In general formula (3), $R_4$ represents H or $CH_3$; M represents hydrogen atom, alkali metal ion, alkaline earth metal ion, ammonium ion or organic amine group.

Monomer D is represented by general formula (4):

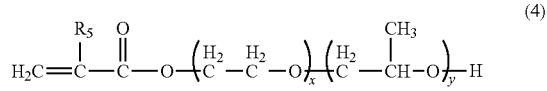
(4)

In general formula (4), $R_5$ represents H or CH3; x and y are respectively adduct number of moles of ethylene oxide and propylene oxide, wherein, x=0 or 1, y=0 or 1, and x and y don't equal to 0 or 1 simultaneously.

Monomer A in general formula (1) of the present invention represents unsaturated polyether macromonomer, in general formula (1), when $R_1$ represents H, the unsaturated macromonomer it represents includes: polyethylene glycol vinyl ether, polyethylene glycol allyl ether and 3-buten-1-alcohol polyglycol ether; when $R_1$ represents $CH_3$, the unsaturated macromonomer it represents includes: polyethylene glycol methallyl ether and 3-methyl-3-butene-1-alcohol polyglycol; these monomers can be used separately or in a mixture of over one of the above in any proportion. The inventors found that, when the comb-shaped polymer molecule contained a longer side-chain, the lump-retaining type polycarboxylate superplasticizer was with better capability of slump retention.

Monomer B represented by general formula (2) in the present invention is (methyl) polyethylene glycol acrylate macromonomer, the acrylate macromonomer represented by it includes: methoxy polyethylene glycol acrylate, ethoxy polyethylene glycol acrylate, propoxy polyethylene glycol acrylate, butoxy polyethylene glycol acrylate, methoxy polyethylene glycol methacrylate, ethoxy polyethylene glycol methacrylate, propoxy polyethylene glycol methacrylate or butoxy polyethylene glycol methacrylate.

The said polymer monomer B in the present invention was an important component for controlling the first layer sustained-release slump retention capability of the polymer molecular. Firstly, monomer B is part of the polymer molecular side-chain, which can provide strong steric hindrance to achieve good dispersion capabilities; secondly, the ester bond in monomer B is gradually generating carboxylic acid groups through hydrolysis, and reducing the coverage of existing carboxylic acid groups in the molecular to increase adsorption capacity of the polymer molecules in short time, providing rapid compensation to early losses on the fluidity of concrete.

The molecular weight of the said polymer monomer B in the present invention was an important component for controlling the first layer sustained-release rate of the polymer molecular. The larger the molecular weight is, indicates the longer the segment is, and the more existing carboxyl groups it covers, also the more adsorption groups are exposed along with its hydrolysis. Therefore, the molecular weight of monomer B can be adjusted according to the actual need, so that to adjust the release rate of polymer dispersion capacity.

The dosage of the said polymer monomer B in the present invention was an important component for controlling the first layer sustained-release rate of the polymer molecular, through adjusting the dosage of monomer B, the early dispersion compensation efficiency can be flexibly regulated.

Monomer C in general formula (3) of the present invention represents carboxylic acid monomers or carboxylate, in general formula (3), $R_4$ represents H or $CH_3$, and the carboxylic acid monomers it represents are acrylic acid and methyl acrylic acid or methacrylate. Monomer C, as provider of initial adsorption groups in the polymer, enables the slump-retaining type polycarboxylate superplasticizer with certain initial dispersion capacity and molecular polarity, which ensures a good compatibility water reducing rate and the superplasticizer.

Monomer D in general formula (4) of the present invention represents hydroxy ester unsaturated small molecules. In general formula (4), when $R_5$ represents H, the unsaturated small molecular monomer D it represents is hydroxyethyl acrylate and hydroxypropyl acrylate; when $R_3$ represents CH₃, the unsaturated small molecular monomer D it represents is hydroxyethyl methacrylate and hydroxypropyl methacrylate;

The said monomer D in the present invention was an important component for controlling the second layer sustained-release slump retention capability of the polymer molecular. Firstly, monomer D has diluted the adsorption group density of the molecular main chain, and has reduced the adsorption power of polymer molecular certain degree, which makes the said polymer molecular in the present invention be able to avoid being adsorbed by cement particles at initial stage of cement system, thus to stay in the cement system solution for longer time, so that it can be used by the later age dispersion compensation; secondly, the ester key in monomer D gradually generated carboxylic groups through hydrolysis, thus gradually increased adsorption power of polymer molecular and gradually increased the content of adsorption groups in main chain, so that to facilitate the polymer to have stronger impetus to adsorb the cement particles or newly generated cement hydration product continuously, thus to achieve the effect of continuous dispersion of cement past.

The dosage of the said monomer D in the present invention was an important component for controlling the duration of second layer sustained-release rate of the polymer molecular, different slump-retaining time can be adjusted through the dosage of monomer D, so that to facilitate the implementation of molecular structure design according to the actual needs of the construction.

As for the said redox initiator in the present invention, the oxidant is hydrogen peroxide of mass concentration not higher than 30%, reducing agent is selected from any one of sodium bisulfite metabisulfite, sodium bisulfite, sodium dithionite, ammonium ferrous sulfate, L-ascorbic acid, and arabo-ascorbic acid or sodium formaldehyde sulfoxylate, in accordance with the most suitable initiating rate of radical polymerization described in the present invention, the preferable reducing agent is L-ascorbic acid or sodium formaldehyde sulfoxylate.

In order to improve the quality of products, the amount of oxidant used in the present invention accounts for 2~10% of the total number of moles of monomer A, monomer B, monomer C and monomer D, and that of the reducing agent accounts for 0.5~5% of the total number of moles. The oxidant in the said redox system was added into the reactor before the start of reaction, and the water solution of the reducing agent was added into the reactor by dripping after the start of the reaction.

In the present invention, the weight-average molecular weight of comb-shaped copolymer concrete superplasticizer for concrete of weight-average molecular weight must be controlled at between 20,000 and 80,000, if the molecular weight is too small and too big, it is bad for the dispersion capacity and slump-retaining performance of concrete. There are many methods for the control of molecular weight in radical polymerization, such as, using polymerization inhibitor, using unsaturated monomer with chain transfer function for copolymerization or chain transfer agent; the present invention preferably adopts chain transfer agent to control the molecular weight of polymer, the chain transfer agent suitable for the present invention can either be selected from one of mercaptoethanol, mercaptoacetic acid, 2-mercaptopropionic acid or 3-mercaptopropionic acid, or the mixture of the above two in any proportions. The amount of chain transfer agents used is 0.5~5% of the total number of moles of monomer (A+B+C+D).

The amount of the said oxidants, reducing agents and chain transfer agents used refers to the amount of active ingredients, if solution is used, then the amount refers to the amount of active ingredients after removing the solvent.

Upon the implementation of the present invention, monomer A and oxidant were added into the reactor prior to the reaction, thus to enhance the conversion rate and polymerization activity of monomer A; aqueous solution of monomer A, monomer B, monomer C, monomer D, chain transfer agent and reducing agent were added into the reactor after the start of the reaction through dripping.

Upon the implementation of the present invention, the controlling of higher concentration of polymerization was carried out under 30~60 wt % and lower polymerization temperature of 30~60□, the duration for dripping of monomers and reducing agent was controlled at between 2 to 6 h. Polymerization time is controlled from 5 to 10 h. After the polymerization reaction, adding alkaline compounds into the reaction products to adjust pH value to 6~8, the said alkaline compounds can select aqueous ammonia, organic amines, monovalent or divalent metal hydroxides or carbonates.

The molecular structure changes may take place to the slump-retaining type polycarboxylate superplasticizer prepared through the method in the present invention under the environment of alkaline cement; it will consequently present excellent dispersion performance during different time periods and can achieve the continuous dispersion to the concrete through the unique triple dispersion regulation of the polymer. Firstly, unsaturated polyether monomer was introduced into the polymer structure as side chain of molecular. Extend the side-chain length to delay the time of polymer being buried by cement hydration products, thus to achieve the effect of continuous dispersion and slow down the early age fluidity loss of concrete; secondly, macromolecular ester side chain that can be decomposed through alkaline hydrolysis is introduced into the polymer structure. This type of side chain has two aspects of effect: □ before hydrolysis, it can provide steric hindrance effect achieve good dispersion capability; □ after the hydrolysis, the side chain off, while generating carboxylic groups, the carboxylic groups previously covered by side chains were exposed, which greatly increased the intensity of existing adsorption groups in polymer molecular, enabling the slump-retaining agent molecular to achieve stronger adsorption power in short time, providing rapid compensation to dispersion capacity of concrete; thirdly, small molecular esters in polymer will gradually increase the content of carboxylic groups through slow hydrolysis under alkaline environment, gradually improving the adsorption power of the polymer molecular for continuous adsorption to achieve the purpose of long-time slump retention.

The conventional dosage of the said slump-retaining type polycarboxylate superplasticizer in the present invention is 0.02% of the total mass of the cement concrete cementitious material, and the best dosage must be validated through on-site mixing experiments of concrete according to the actual needs of the construction. If the amount added is less than 0.02%, the effect of slump retention won't be satisfactory. On the contrary, if the dosage is too much, the slump retention capacity may be so strong that it may cause back-propagation of fluidity of concrete at later age, or even cause concrete segregation, bleeding, and other situations of the deterioration of concrete.

The said slump-retaining type polycarboxylate superplasticizer in the present invention can be used separately, or can also be used together with at least one superplasticizer selected from the known superplasticizer of existing technology, such as, amino sulfonic acid-based superplasticizer, lignin-based superplasticizer, as well as polycarboxylate superplasticizer, so that to improve the slump retention capacity with superplasticizer products of existing technologies. Moreover, besides the known concrete superplasticizer mentioned above, air-entraining agent, bulking agent, retardants, early strength agent, thickening agent, shrinkage-reducing agent, defoamer and other functional additives can also be added according to the actual needs.

The polycarboxylate superplasticizer prepared with the method in present invention has excellent slump retention capacity with low dosage, which both can meet the needs for quick compensation of high performance concrete at early age, and also can meet the needs of a long-term slump retention, effectively improving the effect and adaptability of slump-retaining type polycarboxylate superplasticizer. At the same time, it avoided the issue that the existing slump retention technology can only meet the needs of one aspect of concrete slump, and reached the effect of one addition that has solved the issue of multiple factors affecting the fluidity of concrete simultaneously; it was an important complement to existing technology of slump retention, and was also a significant technological improvement in the development and preparation of slump-retaining additives.

SPECIFIC EMBODIMENTS

The embodiments below described the process of preparation of polymerization product in accordance with the method in the present invention, aiming to make people who are familiar with this technology be able to understand the substance of the present invention and implement accordingly, however, these embodiments will not limit the scope of the present invention. The equivalent changes or modifications made in accordance with the essence of the spirit of the present invention should be covered within the protection scope of the present invention.

In the embodiments of the present invention, the gel permeation chromatography of Wyatt Technology Corporation is used for determination of number average molecular weight of the polymers. (Gel column was Shodex SB806+ 803 two columns in series; Eluant: 0.1M $NaNO_3$ solution; Mobile phase speed: 0.8 ml/min; injection was 20 μl of 0.5% aqueous solution; detector: Shodex RI-71 refractive index detector; Standard substance: polyethylene glycol GPC standards (Sigma-Aldrich, molecular weight: 1010000, 478000, 263000, 118000, 44700, 18600, 6690, 1960, 628, 232).

In the embodiments of the present invention, unless otherwise stated, the cement used was Onoda52.5R. P. II Cement, the sand was medium sand with fineness modulus of Mx=2.6, and the crushed stone was continuous grading macadam with diameter of 5~20 mm. Carry out the cement paste fluidity test with reference to national standard GB/T8077-2000, by adding 87 g of water, measure the cement paste fluidity on the flat glass after mixing for 3 min. Refer to the relevant provisions of GB8076-2008 Concrete Admixture for testing methods of air content and water-reducing rate. Refer to the relevant provisions of JC473-2001 Concrete Pumping Agent for slump and slump loss.

The embodiment of the present invention has used the compound codes referred to in Table 1:

TABLE 1

| | | | Example Compound Codes |
|---|---|---|---|
| Monomer A | General Formula (1) | A-1 | Polyethylene glycol vinyl ether(molecular weight of 6000) |
| | | A-2 | Polyethylene glycol allyl ether(molecular weight 8000) |

TABLE 1-continued

| | | | Example Compound Codes |
|---|---|---|---|
| | | A-3 | Polyethylene glycol methallyl ether(molecular weight of 10000) |
| | | A-4 | 3-methyl-3-butene-1-alcohol polyglycol ether (molecular weight of 12000) |
| Monomer B | General Formula (2) | B-1 | Methoxy polyethylene glycol acrylate(molecular weight of 1000) |
| | | B-2 | Propoxy polyethylene glycol acrylate(molecular weight of 2000) |
| | | B-3 | Ethoxy polyethylene glycol methacrylate(molecular weight of 3000) |
| | | B-4 | Butoxy polyethylene glycol methacrylate(molecular weight of 4000) |
| Monomer C | General Formula (3) | C-1 | Acrylic |
| | | C-2 | Methacrylic Acid |
| Monomer D | General Formula (4) | D-1 | Hydroxyethyl Acrylate |
| | | D-2 | Hydroxypropyl Acrylate |
| | | D-3 | Hydroxyethyl Methacrylate |
| | | D-4 | Hydroxypropyl Methacrylate |

Example 1

Add 160 g of deionized water into the glass reactor equipped with thermometers, blenders, dropping funnel and nitrogen inlet pipe, also add 240 g of A-1 (0.04 mol), purge the reactor with nitrogen while stirring and warm up to 30° C. for dissolution, then add 1.45 g of hydrogen peroxide (concentration of 30%) and mix well. Then mix 80 g of B-2 (0.04 mol), 17.28 g of C-1 (0.24 mol), 41.6 g of D-3 (0.32 mol), 1.2 g of mercaptoacetic acid and 40 g of water, and stir well into monomer aqueous solution, drip it into the reactor for 2 h and drip 40 g of aqueous solution containing 1 g of L-ascorbic acid for about 2 h, after the dripping, keep it for thermal insulation reaction for 2 h, and add 10 g of aqueous solution containing 0.11 g of L-ascorbic acid, and continue the thermal insulation for 1 h, cool it down to room temperature, and then add alkali to neutralize to pH 6.8, yellow transparent liquid with solid content of 60.4% is obtained, and its molecular weight is 50,000.

Example 2

Add 320 g of deionized water into the glass reactor equipped with thermometers, blenders, dropping funnel and nitrogen inlet pipe, also add 320 g of A-2 (0.04 mol), purge the reactor with nitrogen while stirring and warm up to 45° for dissolution, then add 15.2 g of hydrogen peroxide (concentration of 30%) and mix well. Then mix 240 g of B-3 (0.08 mol), 51.6 g of C-2 (0.6 mol), 111.4 g of D-1 (0.96 mol), 0.45 g of 0.45 g 2-mercaptopropionic acid, 0.39 g of mercaptoacetic acid and 220 g of water, and stir well into monomer aqueous solution, drip it into the reactor for 6 h and drip 140 g of aqueous solution containing 11.6 g of sodium formaldehyde sulfoxylate for about 6 h, after the dripping, keep it for thermal insulation reaction for 2 h, and add 30 g of aqueous solution containing 1.3 g of sodium formaldehyde sulfoxylate, and continue the thermal insulation for 1 h, cool it down to room temperature, and then add alkali to neutralize to pH 7.2, yellow transparent liquid with solid content of 49.6% is obtained, and its molecular weight is 42,000.

Example 3

Add 320 g of deionized water into the glass reactor equipped with thermometers, blenders, dropping funnel and nitrogen inlet pipe, also add 60 g of A-1 (0.01 mol) and 200 g of A-2 (0.02 mol), purge the reactor with nitrogen while stirring and warm up to 50° for dissolution, then add 10.7 g of hydrogen peroxide (concentration of 30%) and mix well. Then mix 300 g of B-4 (0.075 mol), 45.4 g of C-1 (0.63 mol), 109.2 g of D-2 (0.84 mol), 4.3 g of mercaptoacetic acid and 300 g of water, and stir well into monomer aqueous solution, drip it into the reactor for 4 h and drip 200 g of aqueous solution containing 9.9 g of L-ascorbic acid for about 4 h, after the dripping, keep it for thermal insulation reaction for 2 h, and add 50 g of aqueous solution containing 1.1 g of L-ascorbic acid, and continue the thermal insulation for 1 h, cool it down to room temperature, and then add alkali to neutralize to pH 7.0, yellow transparent liquid with solid content of 45.2% is obtained, and its molecular weight is 64,000.

Example 4

Add 450 g of deionized water into the glass reactor equipped with thermometers, blenders, dropping funnel and nitrogen inlet pipe, also add 300 g of A-4 (0.025 mol), purge the reactor with nitrogen while stirring and warm up to 60° for dissolution, then add 11.9 g of hydrogen peroxide (concentration of 30%) and mix well. Then mix 100 g of B-1 (0.1 mol), 86 g of C-2 (1 mol), 216 g of D-4 (1.5 mol), 13.9 g of 0.45 g 3-mercaptopropionic acid and 300 g of water, and stir well into monomer aqueous solution, drip it into the reactor for 5 h and drip 200 g of aqueous solution containing 7.3 g of sodium formaldehyde sulfoxylate for about 5 h, after the dripping, keep it for thermal insulation reaction for 2 h, and add 50 g of aqueous solution containing 0.81 g of sodium formaldehyde sulfoxylate, and continue the thermal insulation for 1 h, cool it down to room temperature, and then add alkali to neutralize to pH 6.5, yellow transparent liquid with solid content of 39.6% is obtained, and its molecular weight is 34,000.

Example 5

Add 560 g of deionized water into the glass reactor equipped with thermometers, blenders, dropping funnel and nitrogen inlet pipe, also add 240 g of A-1 (0.04 mol), purge the reactor with nitrogen while stirring and warm up to 40° for dissolution, then add 10 g of hydrogen peroxide (concentration of 30%) and mix well. Then mix 360 g of B-3 (0.12 mol), 55 g of C-2 (0.64 mol), 138.3 g of D-4 (0.96 mol), 1.9 g of 2-mercaptopropionic acid and 700 g of water, and stir well into monomer aqueous solution, drip it into the reactor for 3 h and drip 440 g of aqueous solution containing 8.4 g of L-ascorbic acid for about 3 h, after the dripping, keep it for thermal insulation reaction for 2 h, and add 100 g of aqueous solution containing 0.93 g of L-ascorbic acid, and continue the thermal insulation for 1 h, cool it down to room temperature, and then add alkali to neutralize to pH 7.4, yellow transparent liquid with solid content of 29.8% is obtained, and its molecular weight is 75,000.

Example 6

Add 300 g of deionized water into the glass reactor equipped with thermometers, blenders, dropping funnel and nitrogen inlet pipe, also add 240 g of A-2 (0.03 mol), purge the reactor with nitrogen while stirring and warm up to 60° for dissolution, then add 5.6 g of hydrogen peroxide (concentration of 30%) and mix well. Then mix 120 g of B-1 (0.12 mol), 64.8 g of C-1 (0.9 mol), 195 g of D-3 (1.5 mol), 6.1 g of 0.45 g mercaptoacetic acid and 200 g of water, and stir well into monomer aqueous solution, drip it into the reactor for 4 h and drip 200 g of aqueous solution containing 3.4 g of sodium formaldehyde sulfoxylate for about 4 h, after the dripping, keep it for thermal insulation reaction for 2 h, and add 50 g of aqueous solution containing 0.38 g of sodium formaldehyde sulfoxylate, and continue the thermal insulation for 1 h, cool it down to room temperature, and then add alkali to neutralize to pH 7.1, yellow transparent liquid with solid content of 44.9% is obtained, and its molecular weight is 28,000.

Example 7

Add 240 g of deionized water into the glass reactor equipped with thermometers, blenders, dropping funnel and nitrogen inlet pipe, also add 360 g of A-4 (0.03 mol), purge the reactor with nitrogen while stirring and warm up to 40° for dissolution, then add 27.2 g of hydrogen peroxide (concentration of 30%) and mix well. Then mix 360 g of B-4 (0.09 mol), 72.3 g of C-2 (0.84 mol), 167 g of D-1 (1.44 mol), 7.6 g of 3-mercaptopropionic acid and 200 g of water, and stir well into monomer aqueous solution, drip it into the reactor for 5 h and drip 150 g of aqueous solution containing 15.2 g of L-ascorbic acid for about 5 h, after the dripping, keep it for thermal insulation reaction for 2 h, and add 40 g of aqueous solution containing 1.7 g of L-ascorbic acid, and continue the thermal insulation for 1 h, cool it down to room temperature, and then add alkali to neutralize to pH 7.5, yellow transparent liquid with solid content of 59.1% is obtained, and its molecular weight is 59,000.

Comparison Example 1

Add 120 g of deionized water into the glass reactor equipped with thermometers, blenders, dropping funnel and nitrogen inlet pipe, also add 96 g of APEG (0.04 mol) with molecular weight of 2400, purge the reactor with nitrogen while stirring and warm up to 50° for dissolution, then add 15.2 g of hydrogen peroxide (concentration of 30%) and mix well. Then mix 240 g of B-3 (0.08 mol), 51.6 g of C-2 (0.6 mol), 111.4 g of D-1 (0.96 mol), 0.9 g of 0.45 g 2-mercaptopropionic acid and 460 g of water, and stir well into monomer aqueous solution, drip it into the reactor for 6 h and drip 100 g of aqueous solution containing 11.6 g of sodium formaldehyde sulfoxylate for about 6 h, after the dripping, keep it for thermal insulation reaction for 2 h, and add 20 g of aqueous solution containing 1.3 g of sodium formaldehyde sulfoxylate, and continue the thermal insulation for 1 h, cool it down to room temperature, and then add alkali to neutralize to pH 7.2, yellow transparent liquid with solid content of 41.8% is obtained, and its molecular weight is 53,000.

Comparison Example 2

Add 200 g of deionized water into the glass reactor equipped with thermometers, blenders, dropping funnel and nitrogen inlet pipe, also add 300 g of A-3 (0.03 mol), purge the reactor with nitrogen while stirring and warm up to 60° for dissolution, then add 2.9 g of hydrogen peroxide (concentration of 30%) and mix well. Then mix 17.3 g of C-1 (0.24 mol), 31.2 g of D-2 (0.24 mol), 1.4 g of mercaptoacetic acid and 100 g of water, and stir well into monomer aqueous solution, drip it into the reactor for 4 h and drip 120 g of aqueous solution containing 2.4 g of L-ascorbic acid for about 4 h, after the dripping, keep it for thermal insulation reaction for 2 h, and add 20 g of aqueous solution containing 0.27 g of L-ascorbic acid, and continue the thermal insulation for 1 h, cool it down to room temperature, and then add alkali to neutralize to pH 7.3, yellow transparent liquid with solid content of 50.1% is obtained, and its molecular weight is 48,000.

Comparison Example 3

Add 500 g of deionized water into the glass reactor equipped with thermometers, blenders, dropping funnel and nitrogen inlet pipe, also add 240 g of A-1 (0.04 mol), purge the reactor with nitrogen while stirring and warm up to 30° for dissolution, then add 4.4 g of hydrogen peroxide (concentration of 30%) and mix well. Then mix 360 g of C-3 (0.12 mol), 41.3 g of D-2 (0.48 mol), 2.7 g of 3-mercaptopropionic acid and 500 g of water, and stir well into monomer aqueous solution, drip it into the reactor for 3 h and drip 400 g of aqueous solution containing 4.1 g of L-ascorbic acid for about 3 h, after the dripping, keep it for thermal insulation reaction for 2 h, and add 50 g of aqueous solution containing 0.45 g of L-ascorbic acid, and continue the thermal insulation for 1 h, cool it down to room temperature, and then add alkali to neutralize to pH 6.8, yellow transparent liquid with solid content of 30.4% is obtained, and its molecular weight is 49,000.

Application Example 1

Cement paste fluidity test: Refer to GB/T8077-2000, using 300 g of Onoda 525R.P.II cement, 87 g of water, detailed test data are shown in Table 2.

TABLE 2

Cement Paste Fluidity Test

| No. | Dosage/% | 0 min | 60 min | 120 min | 180 min |
|---|---|---|---|---|---|
| Example 1 | 0.1 | 120 | 245 | 288 | 305 |
| Example 2 | 0.1 | 134 | 250 | 292 | 310 |
| Example 3 | 0.1 | 131 | 240 | 278 | 299 |
| Example 4 | 0.1 | 118 | 229 | 280 | 300 |
| Example 5 | 0.1 | 125 | 258 | 300 | 308 |
| Example 6 | 0.1 | 127 | 236 | 291 | 305 |
| Example 7 | 0.1 | 142 | 264 | 305 | 312 |
| Comparison Example 1 | 0.1 | 156 | 198 | 214 | 223 |
| Comparison Example 2 | 0.1 | 143 | 150 | 248 | 286 |
| Comparison Example 3 | 0.11 | 179 | 298 | 251 | 176 |

Table 2 shows that the polycarboxylate superplasticizer of the present invention can perform continuous dispersion to cement at low dosage, while the following issues have encountered with the proportioned polymer, such as smaller dispersing capacity growth range, insufficient release capacity at early age and inadequate dispersing capacity at later age.

Application Example 2

Setting time, air content and slump test: the determination of air content was carried out in accordance with relevant test methods in GB8076-2008 "Concrete Additives"; in accordance with relevant methods in JC473-2001 "Concrete Pumping Agent", the determination of slump and over time change of slump for 60 min, 120 min and 180 min were carried out to the fresh concrete prepared with products of the present invention and two kinds of commercially available high-performance slump retention agents, the dosage of polycarboxylate superplasticizer was fixed as 0.12% of the amount of cement, and the amount water was adjusted so that the initial slump of the fresh concrete was 15±1 cm, experimental results were shown in table 3.

TABLE 3

Properties of Concrete

| Polycarboxylate Superplasticizer | Dosage/% | Air Content/% | Setting Time/h:min Initial Setting | Setting Time/h:min Final Setting | Fresh concrete slump/development cm 0 min | 60 min | 120 min | 180 min |
|---|---|---|---|---|---|---|---|---|
| Example 1 | 0.12 | 4.5 | 7:25 | 9:30 | 15.2 | 19.8/42 | 22.5/53 | 21.8/51 |
| Example 2 | 0.12 | 4.7 | 7:10 | 9:24 | 14.5 | 19.5/40 | 21.8/52 | 22.0/50 |
| Example 3 | 0.12 | 3.9 | 7:45 | 9:40 | 14.8 | 20.0/43 | 22.2/54 | 21.5/48 |
| Example 4 | 0.12 | 4.0 | 6:58 | 8:53 | 15.4 | 20.1/42 | 22.5/53 | 21.6/51 |
| Example 5 | 0.12 | 4.3 | 7:33 | 9:18 | 14.6 | 19.5/38 | 21.6/49 | 22.4/51 |
| Example 6 | 0.12 | 4.5 | 7:13 | 9:15 | 15.8 | 21.0/45 | 23.4/56 | 22.8/54 |
| Example 7 | 0.12 | 4.1 | 7:36 | 9:22 | 15.0 | 20.3/42 | 22.4/52 | 21.8/52 |
| Comparison Example 1 | 0.12 | 4.2 | 7:55 | 9:47 | 15.4 | 18.8 | 20.3/38 | 19.8/36 |
| Comparison Example 2 | 0.12 | 4.0 | 7:26 | 9:14 | 14.8 | 15.2 | 21.0/45 | 21.1/48 |
| Comparison Example 3 | 0.12 | 4.3 | 7:42 | 9:39 | 15.7 | 21.4/45 | 20.0/38 | 18.4 |
| RX | 0.15 | 5.1 | 8:26 | 10:13 | 15.3 | 19.5/40 | 20.2/43 | 18.8 |
| BK | 0.15 | 4.1 | 7:23 | 9:12 | 14.9 | 20.1/41 | 18.2 | 12.1 |

Note:
RX: commercially available slump product of foreign company; BK: commercially available slump product of a domestic company.

These tests showed that the concrete superplasticizer of the present invention can achieve remarkable performance of slump retention at low dosage; compared with similar products commercially available, it had longer period of slump retention and little impact on the setting time of concrete.

Application Example 3

In order to better characterize the slump retention capacity of the polycarboxylate superplasticizer prepared with the method of the present invention, Application Example 1, Application Example 4, RX (slump-retaining product of a well-known foreign company) and PC-1 (commercial available polycarboxylate superplasticizer) were compounded and compared in the capacity for improvement in the slump retention capacity of conventional polycarboxylate superplasticizer. The test was carried out in accordance with the relevant method in JC473-2001 "Concrete Pumping Agent", the fixed conventional dosage of superplasticizer was 0.1% of the weight of concrete cementitious materials, the initial slump of fresh concrete was adjusted to 21±1 cm through adjustment of water dosage, the experimental results are shown in Table 4.

TABLE 4

| Sample | Dosage/% | Fresh concrete slump/development (cm) | | | |
|---|---|---|---|---|---|
| | | 0 min | 60 min | 120 min | 180 min |
| | | 21.1/42 | 16.5 | 8.9 | — |
| Example 1 | 0.02 | 21.0/41 | 19.8/36 | 18.6 | 15.4 |
| Example 1 | 0.04 | 20.8/40 | 21.3/42 | 20.8/40 | 19.7/35 |
| Example 1 | 0.06 | 20.5/42 | 21.2/46 | 20.9/44 | 20.4/41 |
| Example 1 | 0.1 | 21.3/41 | 22.5/52 | 22.8/54 | 22.0/51 |
| Example 4 | 0.02 | 21.1/42 | 19.5/37 | 18.5 | 15.9 |
| Example 4 | 0.04 | 21.6/42 | 22.4/48 | 21.6/44 | 20.4/40 |
| Example 4 | 0.06 | 20.9/41 | 22.4/50 | 21.9/48 | 21.4/46 |
| Example 4 | 0.1 | 20.8/42 | 23.1/54 | 22.7/57 | 22.6/55 |
| RX | 0.02 | 20.8/42 | 18.1 | 15.2 | 8.4 |
| RX | 0.04 | 21.3/42 | 20.1/40 | 19.2/35 | 16.3 |
| RX | 0.06 | 21.0/40 | 21.2/41 | 20.4/38 | 18.2 |
| RX | 0.1 | 21.2/41 | 22.0/46 | 21.5/45 | 19.5/35 |

Note:
RX: commercially available slump product of foreign company; PC-1: commercially available water-reducing product.

Raw materials, and the upper and lower values of the raw materials cited for the present invention have led to the invention, and embodiments will not be enumerated here.

The invention claimed is:

1. A slump-retaining polycarboxylate superplasticizer, having a weight-average molecular weight of 20,000 to 80,000, obtained by polymerization of monomer A, monomer B, monomer C and monomer D in an aqueous solution and in the presence of a redox initiator, wherein a molar ratio (monomer A+monomer B):monomer C:monomer D is 1:3~8:4~12, wherein, a molar ratio of monomer A and monomer B is 1:1~4, and said monomer A is represented by general formula (1):

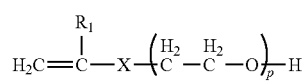

(1)

wherein $R_1$ represents H or $CH_3$; X represents O, $CH_2O$ or $CH_2CH_2O$; p represents an integer between 110 and 350; and said monomer B is represented by general formula (2):

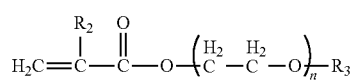

(2)

wherein $R_2$ represents H or $CH_3$; $R_3$ represents alkyl having carbon number of 1~4; n represents an integer between 20 and 90; and said monomer C is represented by general formula (3):

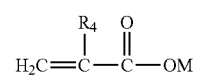

(3)

wherein, $R_4$ represents H or $CH_3$; M represents hydrogen atom, alkali metal ion, alkaline earth metal ion, ammonium ion or organic amine group; and said monomer D is represented by general formula (4):

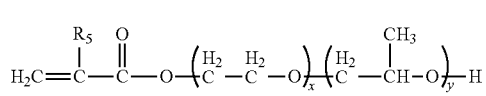

(4)

in formula (4), $R_5$ represents H or $CH_3$; x=0 or 1, y=0 or 1, and x and y don't equal to 0 or 1 simultaneously.

2. The superplasticizer of claim 1, wherein, p represents an integer between 135 and 230.

3. The superplasticizer of claim 1, wherein, the monomer A is selected from polyethylene glycol vinyl ether, polyethylene glycol allyl ether, 3-buten-1-alcohol polyglycol ether, polyethylene glycol methallyl ether and 3-methyl-3-butene-1-alcohol polyglycol ether, or a mixture of any two in any proportions.

4. The superplasticizer of claim 1, wherein, the monomer B is selected from methoxy polyethylene glycol acrylate, ethoxy polyethylene glycol acrylate, propoxy polyethylene glycol acrylate, butoxy polyethylene glycol acrylate, methoxy polyethylene glycol methacrylate, ethoxy polyethylene glycol methacrylate, propoxy polyethylene glycol methacrylate and butoxy polyethylene glycol methacrylate.

5. The superplasticizer of claim 1, wherein, the monomer C represents acrylic or methacrylic acid.

6. The superplasticizer of claim 1, wherein, the monomer D is selected from hydroxyethyl acrylate, hydroxypropyl acrylate, hydroxyethyl methacrylate and hydroxypropyl methacrylate.

7. The superplasticizer of claim 1, wherein, in the redox initiator, the oxidant is hydrogen peroxide of a mass concentration not higher than 30%, the reducing agent is selected from one of sodium bisulfite metabisulfite, sodium bisulfite, sodium dithionite, ammonium ferrous sulfate, L-ascorbic acid, arabo-ascorbic acid and sodium formaldehyde sulfoxylate, the oxidant concentration is at 2~10% of the total number of moles for monomer A, monomer B, monomer C and monomer D, the reducing agent concentration is at 0.5~5% of the total number of moles.

8. The superplasticizer of claim 7, wherein the reducing agent in the redox initiator is L-ascorbic acid or sodium formaldehyde sulfoxylate.

9. The superplasticizer of claim 1, wherein the temperature for the polymerization is 30~60° C., and the polymerization time is 5 h to 10 h.

10. The superplasticizer of claim 1, wherein the weight-average molecular weight of the superplasticizer is controlled by adding a chain transfer agent selected from mercaptoethanol, mercaptoacetic acid, 2-mercaptopropionic acid, 3-mercaptopropionic acid, or a mixture of two thereof in any proportions, and the concentration of the chain transfer agent is 0.5~5% of the total number of moles of monomer A, monomer B, monomer C and monomer D.

* * * * *